United States Patent
Marmer et al.

(10) Patent No.: US 6,200,789 B1
(45) Date of Patent: Mar. 13, 2001

(54) ENZYMATIC TREATMENT OF PROTEINACEOUS ANIMAL BY-PRODUCT MATERIALS TO IMPART COHESION AND STRENGTH

(75) Inventors: William N. Marmer, Fort Washington; Eleanor M. Brown, Philadelphia; Maryann M. Taylor, Richboro, all of PA (US); Luisa F. Cabeza, Barcelona (ES)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/452,939

(22) Filed: Dec. 2, 1999

(51) Int. Cl.$^7$ ............................... C12N 9/10; C14C 1/00
(52) U.S. Cl. ......................... 435/193; 435/262; 435/265
(58) Field of Search .................................. 435/262, 265, 435/193

(56) References Cited

U.S. PATENT DOCUMENTS

| | | |
|---|---|---|
| 3,643,339 | * 2/1972 | Plechac et al. . |
| 5,487,889 | 1/1996 | Eckert et al. . |
| 5,531,795 | 7/1996 | Rasmussen et al. . |
| 5,686,124 | 11/1997 | Moller et al. . |
| 5,968,568 | 10/1999 | Kuraishi et al. . |

OTHER PUBLICATIONS

Brown, E.M., et al., "Production and Potential Uses of Co–Products from Solid Tannery Waste", *JALCA*, vol. 91, pp. 270–276, 1996.

Chobert, J.M., et al., "Recent Advances in Enzymatic Modification of Food Proteins for Improving Their Functional Properties", *Nahrung*, vol. 40(4), S., pp. 177–182, 1996.

Motoki, M., et al., "Transglutaminase and It's Use for Food Processing", *Trends in Food Science & Technology*, vol. 9, pp. 204–210, 1998.

Kuraishi, C., "Production of Restructed Meat using Microbial Transglutaminase without Salt or Cooking", *Journal of Food Science*, vol. 62(3), pp. 488–490 & p. 515, 1997.

Eric Dickinson, "Enzymic Crosslinking as a Tool for Food Colloid Rheology Control and Interfacial Stabilization", *Trends in Food Science & Technology*, vol. 8, pp. 334–339, 1997.

Ikura, K., et al., "Crosslinking of Casein Components by Transglutaminase", *Agric. Biol. Chem.*, vol. 44(7), pp. 1567–1573, 1980.

Motoki, M., et al., "Glutamine–specific Deamidation of $_{s1}$–Casein by Transglutaminase", *Agric. Biol. Chem.*, vol. 50 (12) pp. 3025–3030, 1986.

Nio, N., et al., "Gelation of Casein and Soybean Globulins by Transglutaminase", *Agric. Biol. Chem.*, vol. 49(8), pp. 2283–2286, 1985.

Sakamoto, H., et al., "Strength of Protein Gels Prepared with Microbial Transglutaminase as Related to Reaction Conditions", *Journal of Food Science*, vol. 59(4), pp. 866–871, 1994.

Lorenzen, P. Chr., et al., "Crosslinking of Sodium Caseinate by a Microbial Transglutaminase", *Nahrung*, vol. 42(3/4), S., pp. 151–154, 1998.

Nielsen, G.S., et al., "Impact of Salt, Phosphate and Temperature on the Effect of a Transglutaminse (F XIIIa) on the Texture of Restructured Meat", *Meat Science*, vol. 41(3), pp. 293–299, 1995.

Akamittath, J.G., et al., "Transglutaminase Mediated Polymerization of Crude Actomyosin Refined from Mechanically Deboned Poultry Meat", *Journal of Muscle Foods*, vol. 3, pp. 1–14, 1992.

Toda, H., et al., "Determination of Protein–Bound Glutamine", *Biochim. Biophys. Acta*, vol. 175, pp. 430–433, 1969.

Kleman, J., et al., "Transglutaminase–Catalyzed Cross–Linking of Fibrils of Collagen V/XI in A204 Rhabdomyosarcoma Cells", *Biochemistry*, vol. 34, pp. 13768–13775, 1995.

Raghunath, M., et al., "Cross–Linking of the Dermo–Epidermal Junction of Skin Regenerating from Keratinocyte Autografts", *J. Clin. Invest.*, vol. 98(5), pp. 1174–1184, Sep. 1986.

Sperinde, J.J., et al., "Synthesis and Characterization of Enymatically–Cross–Linked Poly(ethylene glycol) Hydrogels", *Macromolecules*, vol. 30, pp. 5255–5264, 1997.

* cited by examiner

*Primary Examiner*—Francisco Prats
*Assistant Examiner*—Susan D. Ge
(74) *Attorney, Agent, or Firm*—M. Howard Silverstein; John D. Fado; G. Byron Stover

(57) ABSTRACT

A method of producing useful products from animal by-products by incubating animal by-products in a transglutaminase-containing solution to produce transglutaminase-treated animal by-products, compressing the transglutaminase-treated animal by-products to produced a compressed product, and drying the compressed product. The transglutaminase containing solution need not contain casein.

11 Claims, No Drawings

ENZYMATIC TREATMENT OF PROTEINACEOUS ANIMAL BY-PRODUCT MATERIALS TO IMPART COHESION AND STRENGTH

BACKGROUND OF THE INVENTION

The manufacture of high quality leather goods results in an almost equal weight of solid waste material. The U.S. leather industry generates more than 50,000 metric tons of chrome-tanned trimmings, shavings and buffing dust each year, while the world-wide total is about ten times as much (Brown, E. M., et al., JALCA, 91: 270–276 (1996)). Animal by-products, such as trimmings and shavings from the leather industry and feathers from the poultry industry, have traditionally been disposed in landfills. However, increasing environmental concerns and escalating landfill costs necessitate that uses be found for these protein-containing by-products. This invention relates to the use of transglutaminase to produce useful products from such animal by-products. The method of producing such useful products involves incubating animal by-products in a transglutaminase-containing solution to produce transglutaminase-treated animal by-products, compressing the transglutaminase-treated animal by-products to produced a compressed product, and drying the compressed product. The transglutaminase-containing solution need not contain casein. The resulting product is stronger in comparison to controls as measured by force in compression.

The use of transglutaminase to cross-link a variety of proteins, resulting in products with unique properties and improved functionality, has been widely described in the literature. For example, transglutaminase has been used to improve the functional properties of food proteins such as wheat gluten and milk proteins (Chobert, J. M., et al., Nahrung, 40 (4): 177–182 (1996). Microbial transglutaminase treated caseinate has been used to produce larger pieces of restructured meat from their smaller pieces (Motoki, M., and K. Seguro, Trends in Food Science & Technology, 9(5): 204–210 (1998)). U.S. Pat. No. 5,531,795 described the use of microbial transglutaminase in conjunction with casein (which has long been used as a finishing agent for leather) in the area of leather finishing where transglutaminase-improved casein finishes are applied to leather; this patent is actually describing the enhancement of casein finishes with transglutaminase and then the application of these products to leather, not the binding of the finishes to leather or the binding of leather to leather.

SUMMARY OF THE INVENTION

A method of producing useful products from animal by-products by incubating animal by-products in a transglutaminase-containing solution to produce transglutaminase-treated animal by-products, compressing the transglutaminase-treated animal by-products to produced a compressed product, and drying the compressed product. The transglutaminase-containing solution need not contain casein.

DETAILED DESCRIPTION OF THE INVENTION

Animal by-products such as feathers, chrome shavings (waste leather from the process of producing chromium-tanned leather), and aldehyde- and vegetable-tanned leather can be treated with microbial transglutaminase and then compressed and dried to give useful products that are stronger in comparison to controls as measured by force in compression.

The method of producing such useful products involves incubating such animal by-products in a transglutaminase-containing solution to produce transglutaminase-treated animal by-products, compressing the transglutaminase-treated animal by-products to produce a compressed product, and drying the compressed product. The transglutaminase-containing solution need not contain casein.

Transglutaminase of all origins (e.g., human, animal, microbial) may be used in this method. Preferably the transglutaminase is of microbial origin.

Generally the concentration of enzyme in the transglutaminase containing solution is between 1 to 100 units of transglutaminase/g of substrate (i.e., animal by-products); preferably between 6 to 50 units/g of substrate is utilized. The pH of the transglutaminase-containing solution is generally from about 5 to about 10, preferably about 6 to about 7, most preferably about 6.5. The amount of water in the transglutaminase-containing solution is generally about 1–25 parts water to 1 part of substrate, preferably about 1–10 parts water to 1 part of substrate, most preferably about 5 parts water to 1 part of substrate; for example 10 g of by-product in 50 ml water. The incubation time of the animal by-products in the transglutaminase-containing solution is generally up to about 18 hours (if zero time is used then the enzymatic reaction occurs entirely during compression), preferably the incubation time is about one to about eight hours, most preferably about four hours. The incubation temperature is generally from about 5° C. to less than about 85° C. (transglutaminase generally is inactivated at temperatures of above about 85° C.), preferably the incubation temperature is from about 30° C. to about 60° C., most preferably about 50° C.

After the animal by-products have been incubated in the transglutaminase-containing solution, the resulting transglutaminase-treated animal by-products are then compressed at a compression weight of generally about 50 to about 500 kg (preferably about 50 to about 150 kg, most preferably about 100 kg) for generally about 5 to about 50 hours (preferably about 10 to about 30 hours, most preferably about 24 hours). The temperature during compression is generally from about 5° C. to less than about 85° C.; preferably ambient temperature (RT) is utilized. The compressed product is then dried for up to one minute or longer, if vacuum dried, and up to one week or longer if dried at ambient temperature and pressure.

The following examples are intended only to further illustrate the invention and are not intended to limit the scope of the invention as defined by the claims.

EXAMPLES

Materials:

Activa TG-B, Transglutaminase activity approximately 60 units/g (contains sodium caseinate, sugar ester, and dextrin) and Activa TG-TI, Transglutaminase activity approximately 100 units/g (contains malodextrin), were obtained from Ajinomoto U.S.A., Inc. (Teaneck, N.J.). Chrome shavings, cattle hair, wool, feathers, and tanned leather scraps were obtained from commercial sources and stored at room temperature. Sodium bicarbonate was obtained from Fisher Scientific (Fair Lawn, N.J.).

Treatment of samples:

Protein by-products (1–10 g) were suspended in 500–2500% w/v of water containing 1% sodium bicarbonate (w/v) and the appropriate units of microbial transglutaminase (6 or 50 units of Activa TG-B or Activa TG-TI respectively) per gram of protein. The volume of water added depended on the density of the product. The samples were shaken at 50° C. for four hours. Controls for each treated sample, containing no enzyme, were also run. The samples were filtered and then were placed between metal plates installed on Instron Model 1122 (Canton, Mass.); a pressure of 100 kg was applied to both the control and the test samples for 24 hours. The samples were dried and stored in a constant humidity and constant temperature room until testing.

Analyses:

A compression test was run on all control and treated samples using a TA.XT2 Texture Analyzer from Texture Technologies Corporation (Scarsdale, N.Y.). The instrument was equipped with a 2 mm diameter stainless steel punch probe. The samples were placed on a platform equipped with a fixed lexan plate and the probe was driven into the samples a distance of either 0.4 mm or 1.0 mm (depending on the thickness of the samples) at a speed of 1 mm/sec. The force in grams was measured and the area under the curve was calculated in g sec. The difference or percent increase in force between the control samples and the test samples was calculated.

Compression tests were run on chrome shavings samples treated with microbial transglutaminase containing casein and microbial transglutaminase without casein. The results are shown in Table I. In all samples, the resistance to compression is greater in the treated samples as shown by the percent increase. Both the casein-containing and the casein-free microbial transglutaminase preparations gave increases in compression and the addition of more microbial transglutaminase resulted in even higher increases in compression. Differences in the controls are due to variations in sample size.

The physical properties of feathers treated with the microbial transglutaminase preparations are shown in Table II. In both samples the treated feathers had a higher compression than the control. The casein-free sample had more enzyme applied and the percent increase is higher, as was seen in the chrome shavings samples. Without being bound by theory, these feathers may have been more conducive to the transglutaminase treatment because they had been autoclaved at one point and the high temperature might have altered the structure. Literature suggests the enzyme will be more reactive toward a substrate in which the disulfide bonds are broken (Today, H., and J. E. Folk, Biochimica et Biophysica Acta, 175: 427–430 (1969)). Hair and wool samples were also treated but showed no increase in compression between the tests and the controls. The cattle hair had been prepared by shaving a hide and then washing the hair with water and extracting with solvent to remove grease. The wool samples were scoured.

The physical properties of aldehyde- and vegetable-tanned waste leather that had been treated with casein containing microbial transglutaminase are shown in Table III. The aldehyde-tanned product gives a 219% increase in the force for compression, whereas the vegetable tanned sample shows only a 50% increase.

The physical properties of aldehyde- and vegetable-tanned waste leather that had been treated with casein-free microbial transglutaminase are shown in Table IV. In both samples the treated leathers had a higher compression than the control.

Thus treatment of protein-containing waste material, such as chrome shavings, feathers and tanned leather, with casein-free microbial transglutaminase has been shown to be a viable process. When the physical properties of samples treated with transglutaminase were compared to controls, there was a significant increase in strength as measured by force in compression.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE I

Physical Properties of Chrome Shavings Treated[a] with Microbial transglutaminase

| Enzyme (units)[b] | Peak (g)[c] | Area (g sec) |
|---|---|---|
| Activa TG-B[d] | | |
| Control | 924 | 272 |
| Test (6 u) | 1618 | 632 |
| % Increase | 75 | 132 |
| Activa TG-B[d] | | |
| Control | 656 | 203 |
| Test (6 u) | 1136 | 451 |
| % Increase | 72 | 122 |
| Activa TG-B[d] | | |
| Control | 976 | 285 |
| Test (6 u) | 1665 | 532 |
| % Increase | 71 | 87 |
| Activa TG-TI[e] | | |
| Control | 268 | 82 |
| Test (6 u) | 390 | 129 |
| % Increase | 46 | 57 |
| Activa TG-TI[e] | | |
| Control | 374 | 79 |
| Test (50 u) | 1067 | 327 |
| % Increase | 185 | 313 |

[a]Samples treated at 50° C. for 4 hr and compressed at 100 kg for 24 hr
[b]Units of enzyme added/g of protein
[c]Force in compression when a 2 mm probe is driven a distance of 0.4 mm at 1 mm/sec
[d]Microbial transglutaminase with casein
[e]Microbial transglutaminase without casein

TABLE II

Physical Properties of Feathers Treated[a] with Microbial transglutaminase

| Enzyme (units)[b] | Peak (g)[c] | Area (g sec) |
|---|---|---|
| Activa TG-B[d] | | |
| Control | 37 | 29 |
| Test (6 u) | 67 | 47 |
| % Increase | 81 | 62 |
| Activa TG-TI[e] | | |
| Control | 23 | 19 |
| Test (50 u) | 52 | 33 |
| % Increase | 126 | 74 |

[a]Samples treated at 50° C. for 4 hr and compressed at 100 kg for 24 hr
[b]Units of enzyme added/g of protein
[c]Force in compression when a 2 mm probe is driven a distance of 1.0 mm at 1 mm/sec
[d]Microbial transglutaminase with casein
[e]Microbial transglutaminase without casein

TABLE III

Physical Properties of Waste Leather Treated with Microbial Transglutaminase that Contains Casein[a]

| Enzyme (units)[b] | Peak (g)[c] | Area (g sec) |
|---|---|---|
| Aldehyde Tanned Sheepskin[d] | | |
| Control | 424.4 | 129.2 |
| Test (6 u) | 1353.7 | 466.4 |
| % Increase | 219 | 261 |
| Vegetable Tanned Cowhide[d] | | |
| Control | 1043.4 | 290.5 |
| Test (6 u) | 1567.4 | 520.7 |
| % Increase | 50 | 79 |

[a]Activa TG-B
[b]Units of enzyme added/g of protein
[c]Force in compression when a 2 mm probe is driven a distance of 0.4 mm at 1 mm/sec
[d]Samples treated at 50° C. for 4 hr and compressed at 100 kg for 24 hr

TABLE IV

Physical Properties of Waste Leather Treated with Casein-Free Transglutaminase[a]

| Enzyme (units)[b] | Peak (g)[c] | Area (g sec) |
|---|---|---|
| Aldehyde Tanned Sheepskin[d] | | |
| Control | 149.0 | 52.4 |
| Test (50 u) | 370.5 | 133.6 |
| % Increase | 149 | 155 |
| Vegetable Tanned Cowhide[d] | | |
| Control | 75.2 | 20.6 |
| Test (50 u) | 179.8 | 50.5 |
| % Increase | 139 | 145 |

[a]Activa TG-TI
[b]Units of enzyme added/g of protein
[c]Force in compression when a 2 mm probe is driven a distance of 0.4 mm at 1 mm/sec
[d]Samples treated at 50° C. for 4 hr and compressed at 100 kg for 24 hr

We claim:

1. A method of producing high compression strength products from animal by-products, comprising incubating animal by-products in a transglutaminase-containing solution to produce transglutaminase-treated animal by-products, compressing said transglutaminase-treated animal by-products to produce a compressed product, and drying said compressed product, wherein said animal by-products are selected from the group consisting of feathers, chromium-tanned leather, aldehyde-tanned leather, vegetable-tanned leather, and mixtures thereof.

2. The method according to claim 1, wherein said transglutaminase-containing solution contains 1 to 100 units of transglutaminase/g of animal by-products.

3. The method according to claim 1, wherein said transglutaminase-containing solution has a pH of from 5 to 10.

4. The method according to claim 1, wherein said incubating occurs for up to 18 hours.

5. The method according to claim 1, wherein said incubating occurs at a temperature of from about 5° C. to less than about 85° C.

6. The method according to claim 1, wherein said compressing occurs at a compression weight of 50 to 500 kg.

7. The method according to claim 1, wherein said compressing occurs for 5 to 50 hours.

8. The method according to claim 1, wherein said transglutaminase-containing solution does not contain casein.

9. A method of producing high compression strength products from animal by-products, consisting essentially of incubating animal by-products in a transglutaminase-containing solution to produce transglutaminase-treated animal by-products, compressing said transglutaminase-treated animal by-products to produce a compressed product, and drying said compressed product; wherein said animal by products are selected from the group consisting of feathers, chromium-tanned leather, aldehyde-tanned leather, vegetable-tanned leather, and mixtures thereof.

10. The method according to claim 9, wherein said transglutaminase-containing solution does not contain casein.

11. A high compression strength product from animal by-products, said product produced by a method comprising incubating animal by-products in a transglutaminase-containing solution to produce transglutaminase-treated animal by-products, compressing said transglutaminase-treated animal by-products to produce a compressed product, and drying said compressed product; wherein said animal by-products are selected from the group consisting of feathers, chromium-tanned leather, aldehyde-tanned leather, vegetable-tanned leather, and mixtures thereof.

* * * * *